Aug. 21, 1923.
G. G. DOBSON
1,465,352
ELECTRICAL TESTING SYSTEM
Filed Sept. 27, 1920
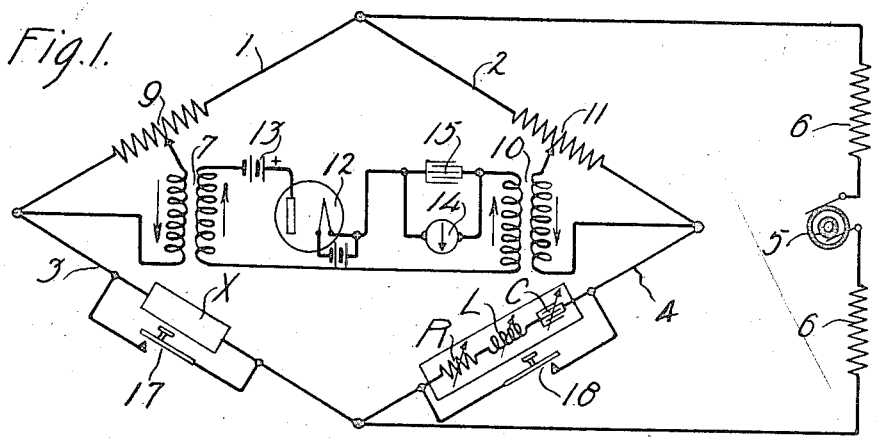
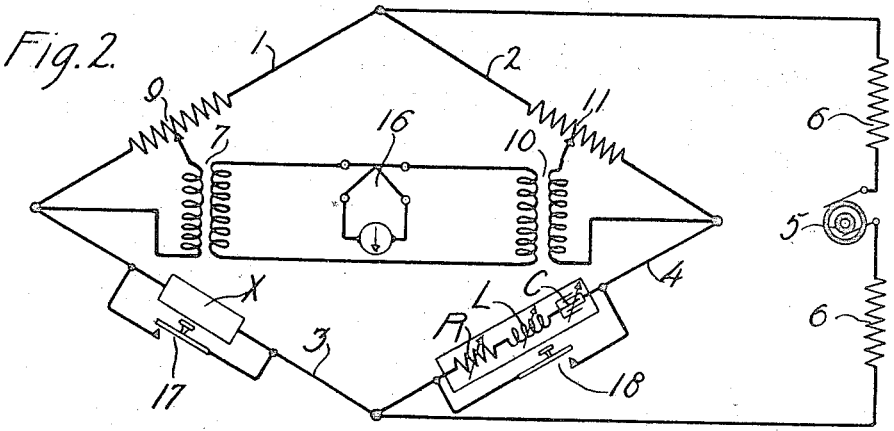
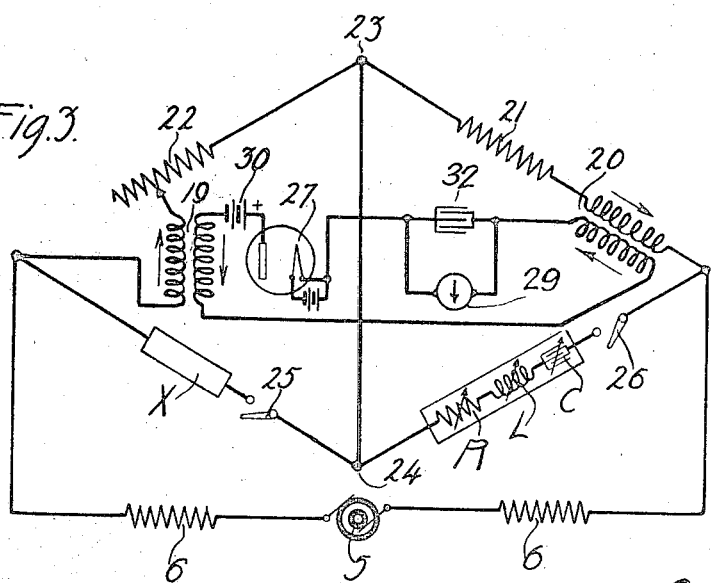
Inventor:
George G. Dobson.
by Joel C. R. Palmer
Atty.

Patented Aug. 21, 1923.

1,465,352

UNITED STATES PATENT OFFICE.

GEORGE G. DOBSON, OF PASSAIC, NEW JERSEY, ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed September 27, 1920. Serial No. 413,208.

*To all whom it may concern:*

Be it known that I, GEORGE G. DOBSON, a citizen of the United States, residing at Passaic, in the county of Passaic and State of New Jersey, have invented certain new and useful Improvements in Electrical Testing Systems, of which the following is a full, clear, concise, and exact description.

This invention relates in general to electrical testing systems and particularly to testing systems to determine unknown values of the characteristics of an electric circuit.

It is the object of the invention to provide a simple arrangement of balanced circuits by which measurements of resistance, inductance, capacity and phase angle of electrical circuits may be quickly and accurately made.

This is accomplished by the invention in its preferred form by the use of two parallel circuits, each having two legs. Two of the legs each contain the primary of a transformer and a means for equalizing the inductive effects in the transformer secondaries. If the transformers are constructed substantially alike, the equalizing means may be omitted. Of the other two legs, one includes the circuit whose characteristics are to be determined and the other includes a combination of variable resistance, capacity and inductance. The transformer secondaries are connected in a secondary circuit which includes a current responsive device differentially connected with the transformer secondaries to indicate a state of balance or unbalance in the parallel circuits. Any source of variable current giving the desired frequency may be used to energize the system.

The invention has a number of advantages over a Wheatstone bridge which will appear from the detailed description of the several forms which the inventor prefers.

The drawing illustrates diagrammatically three forms of the invention. Fig. 1 shows the invention using a direct current, galvonometer and a unilateral conductor valve means employed in the secondary circuit. Fig. 2 shows a similar arrangement adapted for use with a thermo-couple, telephone receiver, or heterodyne as the electro-responsive means of the secondary circuit. Fig. 3 shows a modification of the circuit of Figs. 1 and 2. Like parts of the various figures are indicated by like reference characters.

In Fig. 1 two branch circuits are connected in parallel with each other, one of the branches including the legs 1 and 3 and the other branch including the legs 2 and 4. The two branches are connected with a source of alternating current 5. Suitable resistance elements 6 are connected in series with the source 5 to limit the current and voltage to be impressed on the system. Leg 1 includes the primary of transformer 7 shunted across a variable resistance element 9. Leg 2 includes the primary of transformer 10 shunted across a variable resistance element 11. The transformers 7 and 10 are constructed as nearly alike as possible and in case there is no appreciable difference in their characteristics the elements 9 and 11 may be omitted and replaced by the primaries of the transformers 7 and 10. Leg 3 includes the unknown element X whose characteristics are to be determined. Leg 4 includes variable elements comparable with those to be measured. These variable elements comprise a variable resistance R, a variable inductance L and a variable capacity C.

When the currents in the two parallel branches of the system are balanced, the inductive effects in the secondaries of the transformers 7 and 10 should be equal. As a means for indicating such a balance, a circuit is provided in which the secondaries of the transformers are connected in series opposition and included in the circuit are a thermionic valve 12, a source of direct current 13, a galvanometer 14 and a condenser 15 bridged across the galvanometer 14. The thermionic valve 12 is included in series with the galvanometer 14 in order that a direct current galvanometer may be used. Direct current galvanometers have been found to be more sensitive and reliable for this purpose than alternating current instruments.

Alternating current instruments may, however, be used, as indicated in Fig. 2, where the current indicating device 16 is included in the circuit wherein the secondaries of the transformers 7 and 10 are connected in series opposition. The current indicating device 16 may be a telephone receiver where the source of alternating current 5 has a frequency within the range of audible frequencies, a heterodyne for frequencies used in wireless telephony or telegraphy, or a thermo-couple for any frequency.

To adjust the transformers 7 and 10 to a condition of normal balance, a short-circuiting switch 17 is provided in the leg 3 and a similar switch 18 is provided in leg 4. The variable resistance elements 9 and 11 are then adjusted until the inductive effects in the secondaries of the transformers 7 and 10 exactly balance as is indicated by the current indicating device 16.

When the balance has been thus adjusted, the switches 17 and 18 are opened and the elements R, L, and C are then adjusted until the condition of balance is reestablished. The values of the variable elements R, L, and C will then indicate corresponding characteristics of the unknown element X.

In Fig. 3 the elements are rearranged so that one branch circuit includes the primaries of the transformers 19 and 20, a resistance 21 and a variable resistance 22. The other branch includes the unknown element X and the variable elements R, L and C. As before, the source of alternating current 5 is connected to the branch circuits through the current limiting resistances 6. Preliminary balance of the transformers 19 and 20 is secured by opening the switches 25 and 26 and adjusting the variable resistance 22 until the current induced in the transformer secondaries balance. The circuit arrangement which cooperates to indicate such balance may be the same as is shown in Fig. 1 or Fig. 2. The secondary of transformer 19 is connected in circuit with the thermionic valve 27 and a source of direct current 30 and is provided with an indicating device 29 having in shunt thereof a condenser 32.

When the parallel circuits are connected up, as above described, if the unknown X is balanced by the variable elements R, L and C the points 23 and 24 should be points of equal potential. These points 23 and 24 are connected together to furnish a path for current thereby unbalancing the transformers 19 and 20 when the elements R, L, and C have not been properly adjusted to balance the element X. This unbalance is indicated in the current indicating device 29.

The arrangement as above described may be used for the measurement of substantially pure resistance, inductance or capacity or a combination of these characteristics. In the measurement of reactance as a combination of inductance and capacity, the value of the reactance may be determined in terms of pure inductance or capacity for any given frequency depending upon whether positive or negative. In usual measurements of reactance, such as this testing system is adapted for, such determinations are all that are desired. The values of the inductance and capacity components of the reactance are necessarily computed from reactance measurements in the usual manner.

What is claimed is:

1. In an electrical testing system, an alternating current source, a pair of transformer elements energized in series relation with said source and with one another, an unknown element whose electrical characteristics are to be tested energized in parallel with one of said transformer elements, an element of known characteristics energized in parallel with the other of said transformer elements, an indicating circuit inductively related to said transformer elements whereby electrical measurements may be made when the potential differences across the terminals of two adjacent elements are equal.

2. In an electrical testing system, a source of alternating current, a divided circuit energized by said source, a pair of transformer elements energized in series relation in one branch of said circuit, an element of known characteristics and an element whose electrical characteristics are to be tested, said known and unknown elements being in the other branch of said circuit and an equalizing conductor connected from a point intermediate said transformer elements to a point intermediate said known and unknown elements.

3. A symmetrical quadrilateral testing system comprising a source of alternating electrical current, a transformer element in one arm of said system, a second transformer element in another arm of said system and energized in series relation with said first element, an element of unknown electrical characteristics and an element of known and adjustable characteristics energized respectively in the other two arms of said system, means associated with each of said last named elements for opening said last named arms, an equalizing connection from a point intermediate said transformer elements to a point intermediate said known and adjustable elements, secondary windings inductively related to said transformer elements and connected in series opposed relation, means to rectify the currents induced in one of said secondary windings and a sensitive indicating device responsive to the rectified combined alternating currents induced in said secondary winding.

In witness whereof I hereunto subscribe my name this 24 day of September A. D., 1920.

GEORGE G. DOBSON.